(12) United States Patent
Tosco et al.

(10) Patent No.: US 8,870,257 B2
(45) Date of Patent: Oct. 28, 2014

(54) VEHICLE EQUIPPED WITH A LUGGAGE COMPARTMENT HAVING A HEIGHT-ADJUSTABLE LOADING FLOOR

(71) Applicant: C.R.F. Societa' Consortile per Azioni, Orbassano (IT)

(72) Inventors: Franco Tosco, Orbassano (IT); Giorgio Masoero, Orbassano (IT); Alberto Caruso, Orbassano (IT); Angelo Storgato, Orbassano (IT)

(73) Assignee: C.R.F. Societa' Consortile per Azioni, Orbassano (IT)

( * ) Notice: Subject to any disclaimer, the term of this patent is extended or adjusted under 35 U.S.C. 154(b) by 0 days.

(21) Appl. No.: 13/968,492

(22) Filed: Aug. 16, 2013

(65) Prior Publication Data

US 2014/0049065 A1    Feb. 20, 2014

(30) Foreign Application Priority Data

Aug. 17, 2012    (EP) ..................................... 12180905

(51) Int. Cl.
*B60R 7/04*    (2006.01)
*B60R 5/04*    (2006.01)

(52) U.S. Cl.
CPC ........................ *B60R 5/04* (2013.01)
USPC ..................................................... 296/37.14

(58) Field of Classification Search
CPC ............ B60R 5/04; B60R 7/02; B60N 2/305; B60N 2/36; B23K 37/047; B60P 1/003; B64D 11/003

USPC ................................... 296/37.14, 24.4, 37.16
See application file for complete search history.

(56) References Cited

U.S. PATENT DOCUMENTS

| | | | | | |
|---|---|---|---|---|---|
| 5,061,002 | A | * | 10/1991 | Saso | 296/37.3 |
| 5,080,417 | A | * | 1/1992 | Kanai | 296/37.3 |
| 5,257,846 | A | * | 11/1993 | Kanai et al. | 296/37.14 |
| 5,765,987 | A | * | 6/1998 | Zimmermann | 414/800 |
| 5,799,845 | A | * | 9/1998 | Matsushita | 224/42.14 |
| 5,868,543 | A | * | 2/1999 | McNeilus et al. | 414/512 |
| 5,967,054 | A | * | 10/1999 | Rosenfeld | 108/44 |
| 5,971,462 | A | * | 10/1999 | Bell et al. | 296/37.3 |
| 5,979,962 | A | * | 11/1999 | Valentin et al. | 296/37.1 |
| 6,033,003 | A | * | 3/2000 | Bell et al. | 296/37.3 |
| 6,050,202 | A | * | 4/2000 | Thompson | 108/44 |
| 6,155,625 | A | * | 12/2000 | Felix | 296/37.14 |
| 6,231,096 | B1 | * | 5/2001 | Bollmann et al. | 296/37.16 |
| 6,273,487 | B1 | * | 8/2001 | Schurig et al. | 296/37.14 |
| 6,290,277 | B1 | * | 9/2001 | Spykerman et al. | 296/24.43 |
| 6,406,083 | B2 | * | 6/2002 | Bharj et al. | 296/37.16 |

(Continued)

FOREIGN PATENT DOCUMENTS

| DE | 198 15 466 A1 | 10/1999 |
|---|---|---|
| DE | 20 2006 007 784 U1 | 9/2006 |
| DE | 10 2010 007 088 A1 | 8/2011 |

*Primary Examiner* — Kiran B Patel
(74) *Attorney, Agent, or Firm* — Dickstein Shapiro LLP

(57) ABSTRACT

A vehicle is provided with a luggage compartment that houses an additional support unit having a loading floor, height-adjustable between a lowered position and at least one raised position; when in the raised position, the loading floor is supported, but can rotate upwards about a horizontal axis of rotation; the unit has two levers, which are hinged to a fixed structure about a first horizontal axis and to the loading floor about a second horizontal axis, which is set apart from the first horizontal axis by a variable distance.

11 Claims, 5 Drawing Sheets

(56) References Cited

U.S. PATENT DOCUMENTS

| | | | | |
|---|---|---|---|---|
| 6,439,633 | B2 * | 8/2002 | Nemoto | 296/37.14 |
| 6,644,710 | B2 * | 11/2003 | Seel et al. | 296/37.5 |
| 6,773,046 | B2 * | 8/2004 | Nakamitsu et al. | 296/37.16 |
| 6,811,196 | B2 * | 11/2004 | Gammon | 296/37.1 |
| 6,890,015 | B2 * | 5/2005 | Carlsson et al. | 296/37.14 |
| 7,017,980 | B1 * | 3/2006 | Bejin et al. | 296/193.07 |
| 7,059,646 | B1 * | 6/2006 | DeLong et al. | 296/24.43 |
| 7,179,040 | B2 * | 2/2007 | Masuda et al. | 414/462 |
| 7,182,382 | B2 * | 2/2007 | Harima et al. | 296/37.2 |
| 7,188,881 | B1 * | 3/2007 | Sturt et al. | 296/26.1 |
| 7,762,602 | B2 * | 7/2010 | Bohlke et al. | 296/37.16 |
| 7,794,004 | B2 * | 9/2010 | Aebker et al. | 296/37.8 |
| 8,172,295 | B2 * | 5/2012 | Fischer et al. | 296/24.43 |
| 8,205,926 | B2 * | 6/2012 | Beckley et al. | 296/37.14 |
| 8,215,691 | B2 * | 7/2012 | Ewing | 296/26.02 |
| 8,398,140 | B2 * | 3/2013 | Dinger et al. | 296/37.5 |
| 8,534,736 | B1 * | 9/2013 | Whalen | 296/37.16 |
| 8,720,969 | B2 * | 5/2014 | Young | 296/97.23 |
| 2001/0022451 | A1 * | 9/2001 | Ando et al. | 296/37.16 |
| 2004/0105744 | A1 * | 6/2004 | Warner et al. | 414/522 |
| 2004/0262345 | A1 | 12/2004 | Polburn et al. | |
| 2006/0016840 | A1 * | 1/2006 | Svenson et al. | 224/42.32 |
| 2006/0145501 | A1 * | 7/2006 | Warner et al. | 296/37.3 |
| 2008/0038101 | A1 * | 2/2008 | Klatt | 414/345 |
| 2014/0117695 | A1 * | 5/2014 | Murru | 296/24.44 |

* cited by examiner

# VEHICLE EQUIPPED WITH A LUGGAGE COMPARTMENT HAVING A HEIGHT-ADJUSTABLE LOADING FLOOR The present invention relates to a vehicle equipped with a luggage compartment having a height-adjustable loading floor.

BACKGROUND OF THE INVENTION

German utility model DE202006007784U1 teaches providing an additional loading floor in a luggage compartment. The additional loading floor is movable between a lowered position and a raised position and is constrained to the bottom floor of the luggage compartment by means of levers. When the loading floor is in the lowered position, these levers are housed in a longitudinal slot made in a front portion of the loading floor. The levers have a first end, hinged to the bottom floor about a first horizontal axis, and a second end, which is opposite to the first and is guided by the slot so that it slides in a longitudinal direction when the loading floor is raised and is then manually pulled backwards, towards the outside of the luggage compartment.

When the second end of the levers comes out from the slot, the loading floor can rotate with respect to the levers about a second horizontal axis parallel to the first and then be placed in the raised position. In particular, elastic elements are provided to push the second end of the levers outside of the slot and thus facilitate the manoeuvres of raising the loading floor.

The need is felt to improve the above-described known solution by eliminating the above-mentioned slot, which can be relatively complex to produce, whilst keeping the functioning unchanged.

In addition, the need is felt to have greater freedom in adjusting the height of the loading floor when the latter is placed in its raised position.

SUMMARY OF THE INVENTION

The object of the present invention is that of providing a vehicle equipped with a luggage compartment having a height-adjustable loading floor, which enables the above-described requirements to be met in a simple and inexpensive manner and, preferably, allows the loading floor to be supported in a stable manner when the latter is placed in its raised position.

According to the present invention, a vehicle is provided as defined in claim 1.

BRIEF DESCRIPTION OF THE DRAWINGS

For a better understanding of the present invention a preferred embodiment will now be described, purely by way of a non-limitative example, with reference to the attached drawings, where.

DETAILED DESCRIPTION OF THE INVENTION

Figure 1:
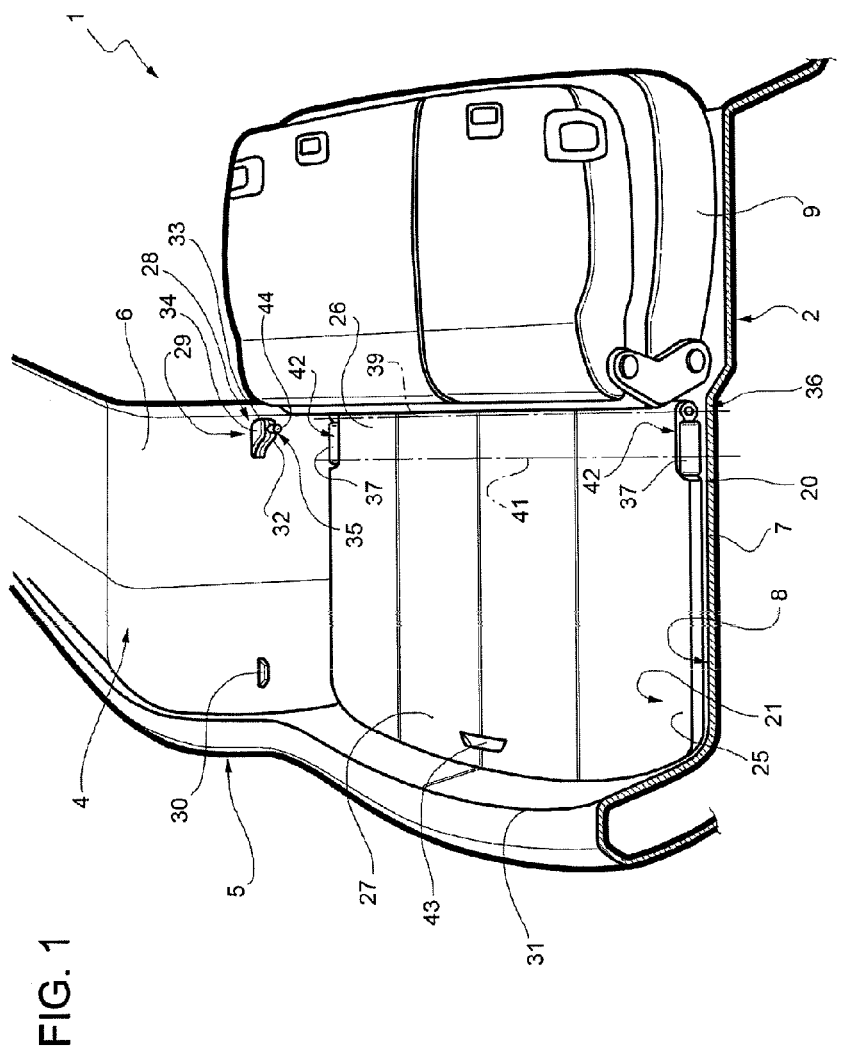
FIG. 1 shows, in perspective and in a simplified manner with parts removed for clarity, a preferred embodiment of the vehicle equipped with a luggage compartment having a height-adjustable loading floor according to the present invention.

In FIG. 1, reference numeral 1 indicates, as a whole, a vehicle 1 (partially shown) comprising a structure 2 (partially shown) that defines a luggage compartment 4, to which access can be gained through a rear opening 5. In particular, the structure 2 comprises two sides 6, of which only one is shown, and a bottom floor 7 having a substantially horizontal upper surface 8, upon which luggage can be stood (not shown). According to a variant that is not shown, at least part of the bottom floor 7 can be liftable, like a hatch for example, to provide access to an underlying compartment that houses a spare wheel and/or a toolkit for the vehicle, and/or an empty underlying compartment provided for stowing miscellaneous objects. The luggage compartment 4 is delimited at the front by a rear seat 9, which preferably has a fold-down seatback to place the luggage compartment 4 in communication with the passenger compartment of the motor vehicle 1 and extend the luggage space.

The vehicle 1 also comprises a unit 20 to enable standing luggage on an additional surface 21 and to obtain an underlying space 22 (FIG. 3) between surfaces 21 and 8.

The unit 20 comprises a loading floor 25 defined by a single panel having surface 21 as the upper surface. The loading floor 25 has a width substantially equal to that of the luggage compartment 4 and is height-adjustable, i.e. a user can manually move it between a lowered position and at least one raised position, with respect to the bottom floor 7. In the lowered position, the loading floor 25 is positioned just above surface 8, or rests directly on surface 8, and hence the underlying space 22 is absent and it is only possible to stand luggage on surface 21.

The unit 20 also comprises a support device 28 to support the loading floor 25, and consequently the luggage, when the loading floor 25 is placed in its raised position.

According to one preferred aspect of the present invention, the support device 28 comprises at least two hinge and support elements 29, connected to the structure 2 in a fixed position, preferably on the sides 6, to hinge and directly support a front portion 26 of the loading floor 25, as will be described in greater detail hereinafter.

Furthermore, the support device 28 also comprises at least one rear support, to support a rear portion 27 of the loading floor 25. In particular, two brackets 30 are provided, connected to the sides 6 and substantially aligned with the hinge and support elements 29, parallel to the longitudinal direction of travel of the vehicle 1. When the loading floor 25 is placed in the raised position, the rear edge of the rear portion 27 is adjacent to a cross-beam 31 that defines the bottom sill of the rear opening 5, so as not to leave a gap between the loading floor 25 and the cross-beam 31.

Figure 2:
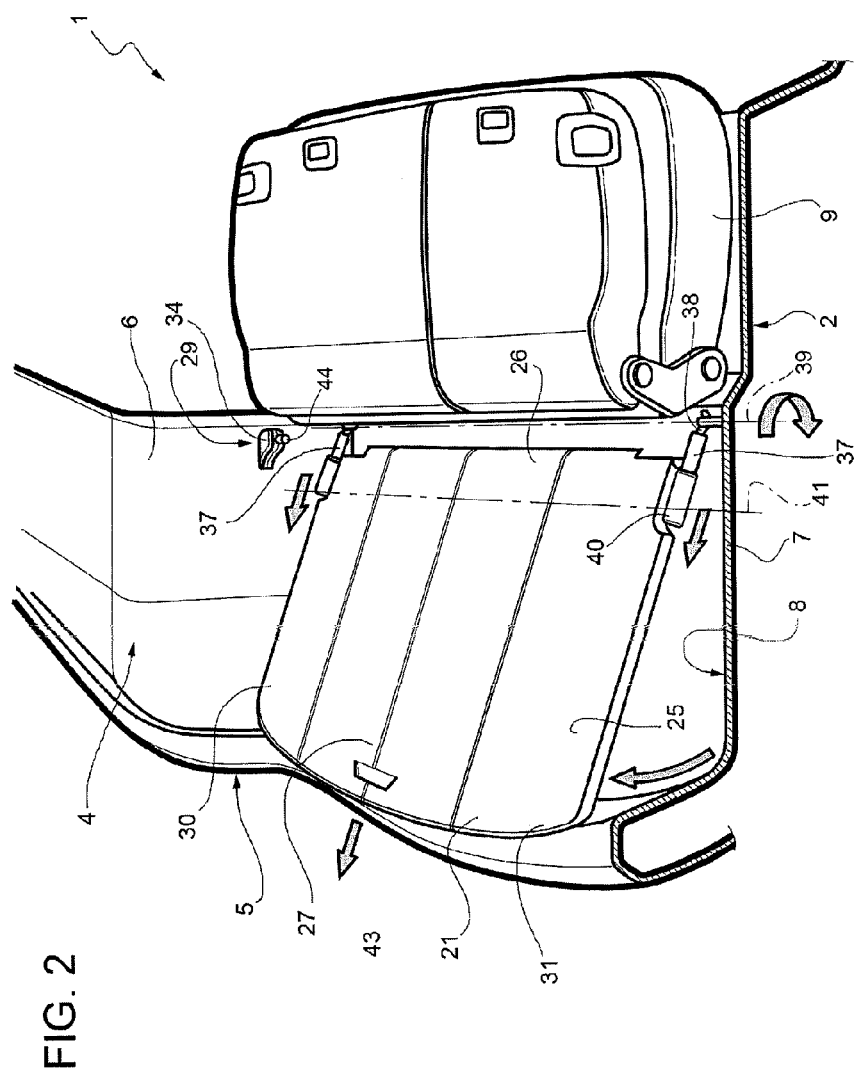
FIGS. 2 and 3 are similar to FIG. 1 and show two steps of adjusting the height of the loading floor.
Figure 3:
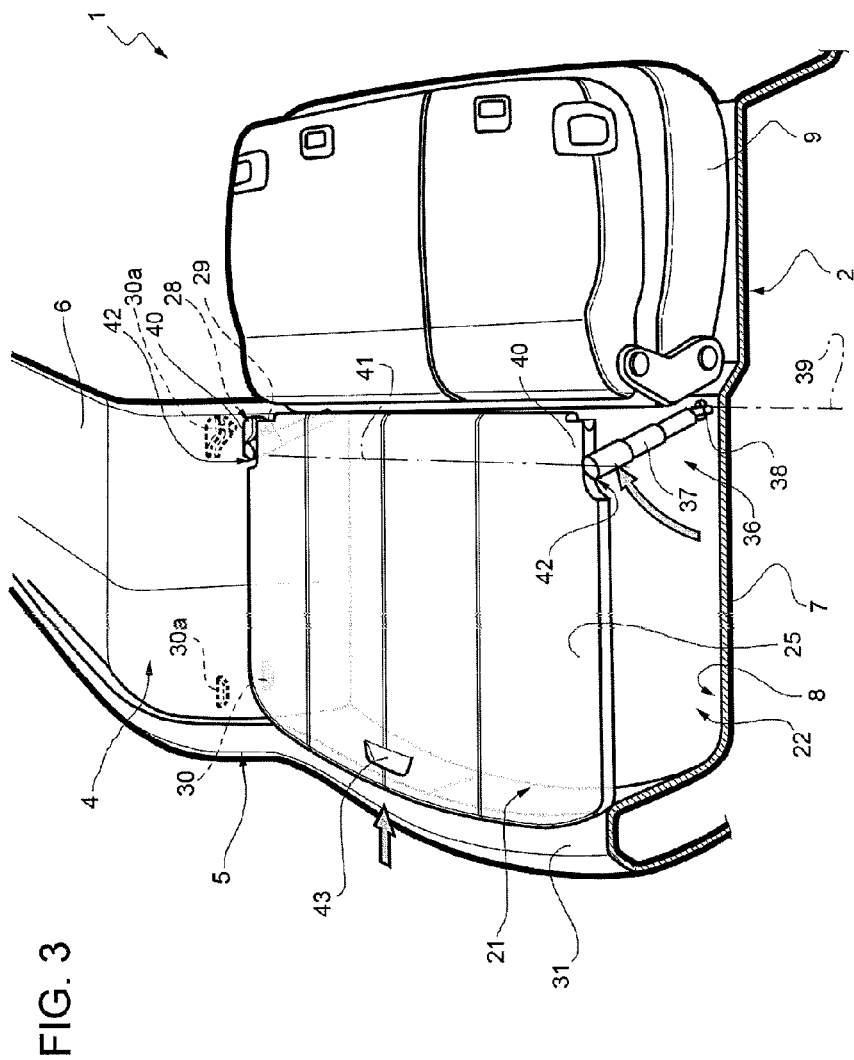

Preferably, as can be seen in FIGS. 2 and 3, the hinge and support elements 29 are defined by pins that face each other along a horizontal axis 32, orthogonal to the longitudinal direction of travel of the vehicle 1, and are suitable for engaging, in a releasable manner, respective seats 33 made in the front portion 26. In particular, the front portion 26 has two front openings 34 that allow the pins 29 to enter and exit with respect to the seats 33 along insertion directions substantially parallel to the longitudinal direction of travel of the vehicle 1. Preferably, the seats and the pins 29 are made of a material and/or have a diameter and/or shape such that they can be snap-fit coupled to each other, resulting in the pins 29 keeping the loading floor 25 in a fixed longitudinal position.

When they are engaged with each other, the seats 33 and the pins 29 define a hinge between the front portion 26 and the sides 6, enabling the loading floor 25 to turn about axis 32, as will also be reasserted hereinafter.

As an alternative to that described above, the pins 29 could be carried by the loading floor 25 and the seats 33 could be carried by the structure 2.

The unit 20 also comprises a lever device 36 that connects the loading floor 25 to the structure 2 to guide and facilitate moving the loading floor 25 between the raised and lowered positions.

With reference to FIG. 3, the lever device 36 is formed by two levers 37, each of which has an end portion 38 hinged to the structure 2 about a fixed horizontal axis 39, parallel to axis 32, and an end portion 40 that is opposite to end portion 38 and is hinged to the front portion 26 about a horizontal axis 41, parallel to axes 39 and 32. The levers are arranged on opposite lateral sides of the front portion 26.

According to a variant that is not shown, the lever device is formed by a single lever, defined for example by a plate hinged to the front edge of the front portion 26.

According to the present invention, the distance between axes 39 and 41 is variable, in particular because the levers 37 are telescopic, so that the levers 37 can be shortened when the loading floor 25 is placed in its lowered position (FIG. 1) and/or to adjust the height position of the loading floor 25 and thus the size of the underlying space when the loading floor 25 is placed in its raised position.

To perform this last function, the support device 28 comprises a plurality of brackets 30 and 30a placed at different heights and selectable to support the loading floor 25 at the desired height, and/or the hinge and support elements 29 and the brackets 30 have a height-adjustable position, along the sides 6, in a manner that is not shown.

When the loading floor 25 is in the lowered position (FIG. 1), the levers 37 are substantially parallel to surface 21, are configured in a state of minimum length and are housed in respective recesses 42 along the sides of the front portion 26.

Figure 5:
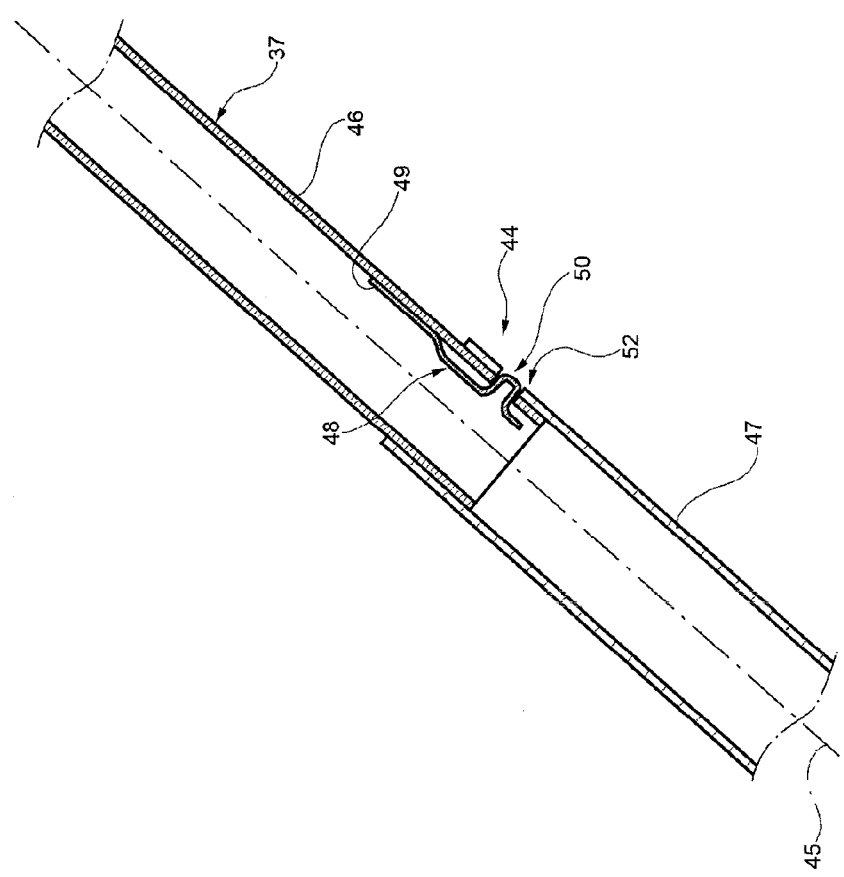
FIG. 5 shows, in cross section and on a larger scale, a component of the vehicle in FIG. 1.

As shown in the example in FIG. 5, the levers 37 comprise respective retaining devices 44, which are able to maintain the distance set between axes 39 and 41 if a pulling/pushing force exceeding a given force is not applied to the levers 37.

For example, the retaining devices 44 can be of the snap-fit type and, for each lever 37, define a plurality of predefined reference positions corresponding to the different heights at which the loading floor 25 can be positioned.

As mentioned above, each lever 37 is telescopic, and therefore comprises a plurality of sections, which can slide one within the other in a direction 45 orthogonal to axes 39 and 41. FIG. 5 shows two adjacent sections defined, for example, by respective tubes 46 and 47, of which tube 46 is the one with the smaller diameter and that can slide inside tube 47.

The retaining device 44 comprises a spring 48, for example a leaf spring, placed inside tube 46 and having one end 49 fastened to tube 46. The opposite end of the spring 48 defines a stop element 50, which is able to engage a hole 52 in tube 47. The hole 52 is aligned with the stop element 50 along a generatrix of the lever 37 and is engaged by the stop element 50 when it moves over the latter during the elongation of the lever 37. In consequence, the coupling between the stop element 50 and the hole 52 holds the tubes 46 and 47 in a fixed relative position until the lever 37 is shortened by a force that exceeds a threshold, given by the elasticity of the spring 48. An identical retaining device 44 is provided for each pair of adjacent sections along the levers 37, and hence it is possible to fully or just partially extend the levers 37.

With reference to FIG. 1, the loading floor 25 can be manually moved between the raised and lowered positions by acting on a grip portion 43 made in the rear portion 27. In particular, starting from the lowered position and lifting the grip portion 43, the loading floor 25 is made to turn about at least one of axes 39 and 41, until the rear edge of the rear portion 27 exceeds the height of the cross-beam 31. Preferably, the positions of the brackets 30 in the longitudinal direction on the sides 6 are set so as not to cause interference with the rear portion 27 during this upward rotation.

Then, by pulling the grip portion 43 outwards from the luggage compartment 4, i.e. parallel to direction 45, the levers 37 become elongated (FIG. 2) and the loading floor 25 passes above the brackets 30. Thanks to the retaining devices 44, the extension applied to the levers 37 is also maintained during the subsequent manoeuvres.

At this point, by letting the rear portion 27 come down, the latter can rest on the brackets 30 and/or on the cross-beam 31. At the same time, the rear portion 27 is pushed forwards so as to make the levers 37 rotate about axis 39, until the pins 29 engage in the respective seats 33.

If the grip portion 43 is pulled outwards from the luggage compartment 4, the loading floor 25 can be disengaged and withdrawn from the hinge and support elements 29 and then be placed in the rest position again, substantially by following a sequence of operations in reverse to those described above.

Alternatively, by pulling the grip portion 43 upwards when the loading floor 25 is in the raised position, the loading floor 25 can rotate upwards about axis 32 without disengaging the hinge and support elements 29 to access the underlying space 22, which is normally hidden from view from outside the vehicle 1 (precisely thanks to the loading floor 25). During rotation of the loading floor 25, by applying sufficient force to overcome the constraint of the retaining devices 44, the levers 37 extend beyond the position defined by the retaining devices 44 to allow moving further away from axes 39 and 41, i.e. so-called overtravel. After having rotated the loading floor 25 downwards, the retaining devices 44 block the relative position of axes 39 and 41 again.

Thus, thanks to the hinge coupling between the hinge and support elements 29 and the front portion 26, it is possible to freely rotate the rear portion 27 upwards, keeping the longitudinal position of the loading floor 25 fixed.

According to a variant that is not shown, the levers 37 have respective springs that are preferably arranged inside them and exert a pushing and/or pulling action to facilitate movement away from and/or towards axes 39 and 41.

Figure 4:
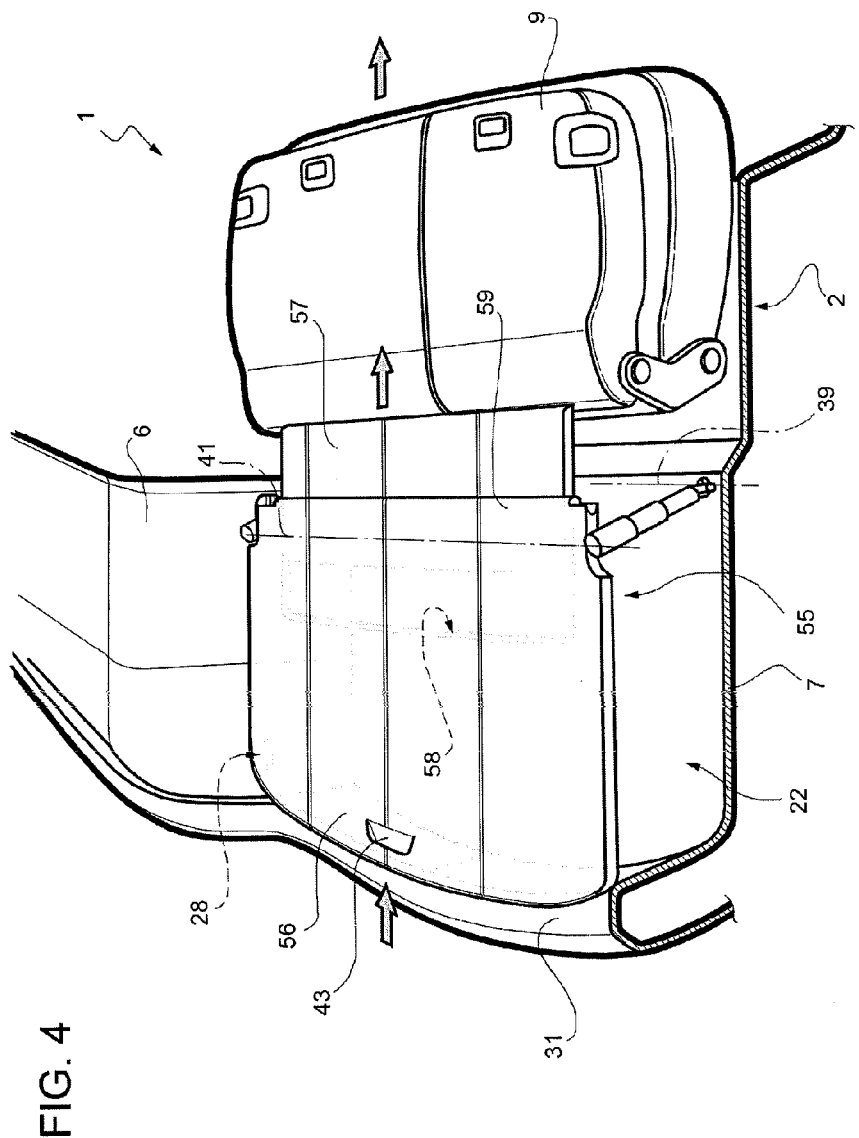
FIG. 4 is similar to FIG. 3 and shows a variant of the loading floor according to the present invention.

FIG. 4 shows another variant of the vehicle 1, where the various components have been indicated, where possible, with the same reference numerals as in FIGS. 1-3. In this case, the rear seat 9 can slide in a longitudinal direction to vary the length of the luggage compartment 4 and underlying space 22. At the same time, the loading floor 25 is substituted by a loading floor 55 comprising a rear panel 56 and at least one front panel 57.

Panel 57 is connected to panel 56 in such a way as to slide parallel to the latter and cover the possible gap between the front edge of panel 56 and the rear seat 9, and therefore to change the length of surface 21 depending on the longitudinal position of the rear seat 9 when the loading floor 55 is placed in its raised position.

Preferably, panel 57 slidingly engages a seat 58 made in a front portion 59 of panel 56 and projects from the seat 58 so as to rest against the rear seat 9.

In consequence, the length of the loading floor 25 can be manually varied to adapt the unit 20 to the longitudinal movement of the rear seat 9. In particular, panel 57 is only supported by the guide of panel 56, without brackets and/or guides on the sides 6. Preferably, a releasable catch system (not shown) is provided to secure the panel 57 in a retracted position with respect to panel 56 (for example, completely inside the seat 58, if the latter is provided), in particular to enable easily putting the loading floor 55 back into its lowered position.

In the case where the rear seat 9 is of the split type, the front panel 57 is substituted by two panels of substantially the same length, arranged side by side and guided independently from the rear panel 56.

The hinge and support elements 29 are also provided in the variant in FIG. 4, these being coupled to the sides of the front portion 59 to form a hinge for rotation about axis 32.

From the foregoing, it is evident that the loading floor 25 or 55 can be positioned at different heights in the luggage compartment 4 and is relatively compact in its lowered position, thanks to the variable length of the levers 37. In particular, the type of levers 37 avoids making guides or slots directly in the loading floor 25, and so the latter is relatively simple to manufacture. In fact, the end portions 40 are hinged directly to the loading floor 25.

Always thanks to the absence of guides or slots in the loading floor 25, the loading floor 25 or 55 is relatively rigid to support the weight of the luggage.

Furthermore, the loading floor 25 or 55 is supported in the raised position in a stable manner and, at the same time, forms a hinge thanks to the coupling between the hinge and support elements 29 and the front portion 26. Therefore, the loading floor 25 or 55 can be rotated to access the underlying space 22 without movements in the longitudinal direction.

In addition, the characteristics of the unit 20 permit having a relatively compact and comparatively easy to use solution with regard to moving the loading floor 25 between the raised and lowered positions. In fact, it is possible to move the loading floor 25 up and down using just one hand, by grasping the grip portion 43.

Finally, it is evident that modifications and variations can be applied to the vehicle 1 described and illustrated herein without leaving the scope of protection of the present invention, as defined in the appended claims.

In particular, the shape of the hinge and support elements 29 and the brackets 30 could be different from that shown by way of example; or the hinge and support elements 29 could be coupled to the end portions 40 of the levers 37 and not to portion 26 or 59 to support the loading floor 25 or 55, in which case, when it is in the raised position, the loading floor 25 or 55 can turn about axis 41 instead of about axis 32.

Furthermore, as an alternative to the example in FIG. 5, the retaining element 50 could be a separate body from the spring 48; and/or a rack or friction system could be provided instead of the holes 52.

The invention claimed is:

1. A vehicle comprising:
   a luggage compartment;
   an additional support unit arranged in said luggage compartment and comprising:
   a) a loading floor height-adjustable between a lowered position and at least one raised position;
   b) a support device to support said loading floor in the raised position;
   c) lever means having a first end portion hinged to a fixed structure about a first horizontal axis and a second end portion hinged to a attachment portion of said loading floor about a second horizontal axis;
   said first and second horizontal axes being set apart from, and parallel to, each other, and being orthogonal to a longitudinal direction of travel of the vehicle;
   said loading floor, when in the raised position, being rotatable upwards about a horizontal axis of rotation;
   wherein the distance between said first and second horizontal axes is variable.

2. The vehicle according to claim 1, wherein said support device comprises a plurality of brackets placed at different heights and selectable to support the loading floor at anyone of said heights.

3. The vehicle according to claim 1, wherein said support device comprises brackets having a height-adjustable position along the sides of said luggage compartment.

4. The vehicle according to claim 1, wherein said lever means comprise retaining means able to maintain a set distance between said first and second horizontal axes if a pulling/pushing force exceeding a given force is not applied to said lever means.

5. The vehicle according to claim 1, wherein said lever means comprise a first and at least a second section that can slide with respect to each other along a sliding direction orthogonal to said first and second horizontal axes.

6. The vehicle according to claim 5, wherein said lever means comprise retaining means able to maintain a set distance between said first and second horizontal axes if a pulling/pushing force exceeding a given force is not applied to said lever means; said retaining means comprising:
   elastic means;
   at least one retaining seat carried by said second section;
   a stop element carried by said first section and pushed by said elastic means so as to engage said retaining seat when said stop element reaches the position of said retaining seat during the extension of said lever means.

7. The vehicle according to claim 1, wherein it comprises hinge means defining said horizontal axis of rotation and comprising:
   first hinge means, forming part of said support device;
   second hinge means, carried by said loading floor and engaged by said first hinge means in a releasable manner when said loading floor is in the raised position.

8. The vehicle according to claim 7, wherein one of said first and second hinge means is defined by a pair of seats and the other of said first and second hinge means is defined by a pair of pins, which snap-fit engage with said seats when said loading floor is in the raised position.

9. The vehicle according to claim 1, wherein said lever means are constituted by two levers arranged on opposite lateral sides of said attachment portion.

10. The vehicle according to claim 1, wherein said loading floor is defined by a single panel; said attachment portion being defined by a front end portion of said single panel.

11. The vehicle according to claim 1, wherein said loading floor comprises a rear panel and at least one front panel, moveable with respect to said rear panel to cover a possible gap with regard to a slidable rear seat of the vehicle; said attachment portion being defined by a front end portion of said rear panel.

* * * * *